United States Patent [19]
Jessick

[11] 3,771,693
[45] Nov. 13, 1973

[54] VIAL LOADING APPARATUS

[76] Inventor: James J. Jessick, Tuckahoe Rd., Franklin Township, Gloucester, N.J. 08322

[22] Filed: May 17, 1972

[21] Appl. No.: 254,056

[52] U.S. Cl. .............................. 221/171, 221/200
[51] Int. Cl. .............................................. B65h 3/06
[58] Field of Search .................... 221/171, 172, 173, 221/156, 200; 198/33 AD; 193/43 B, 43 C, 43 D

[56] References Cited
UNITED STATES PATENTS
2,623,803  12/1952  Gamble ............................. 221/172

Primary Examiner—Stanley H. Tolberg
Attorney—Harvey B. Jacobson

[57] ABSTRACT

An apparatus to automatically load small cylindrical glass vials into an indexing machine with the open end disposed upwardly and the rounded closed end being disposed downwardly so that the indexing machine may position the vials for filling with a flowable material after which the vial is sealed to form a closed container. A supply hopper having an inclined bottom defined by spaced rails that support the vials in horizontal disposition. A gate is provided to allow discharge of a single vial for each discharge operation with a guide block receiving the vial from the timing gate with the block having a slot therein which directs the vials into an upright position, that is, bottom end down and open end up for positioning in an indexing machine.

15 Claims, 8 Drawing Figures

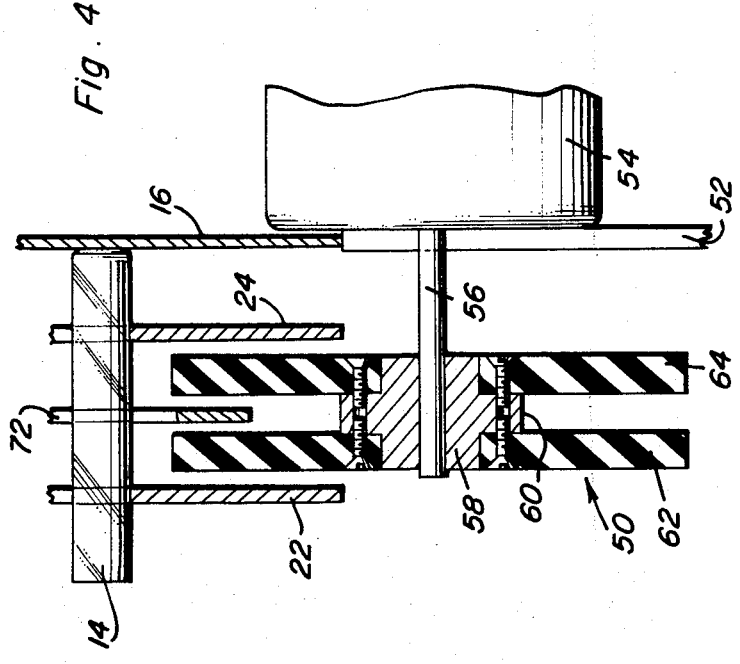
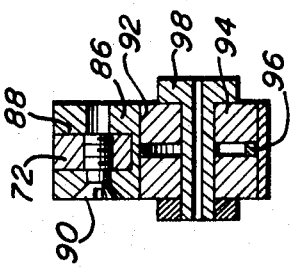
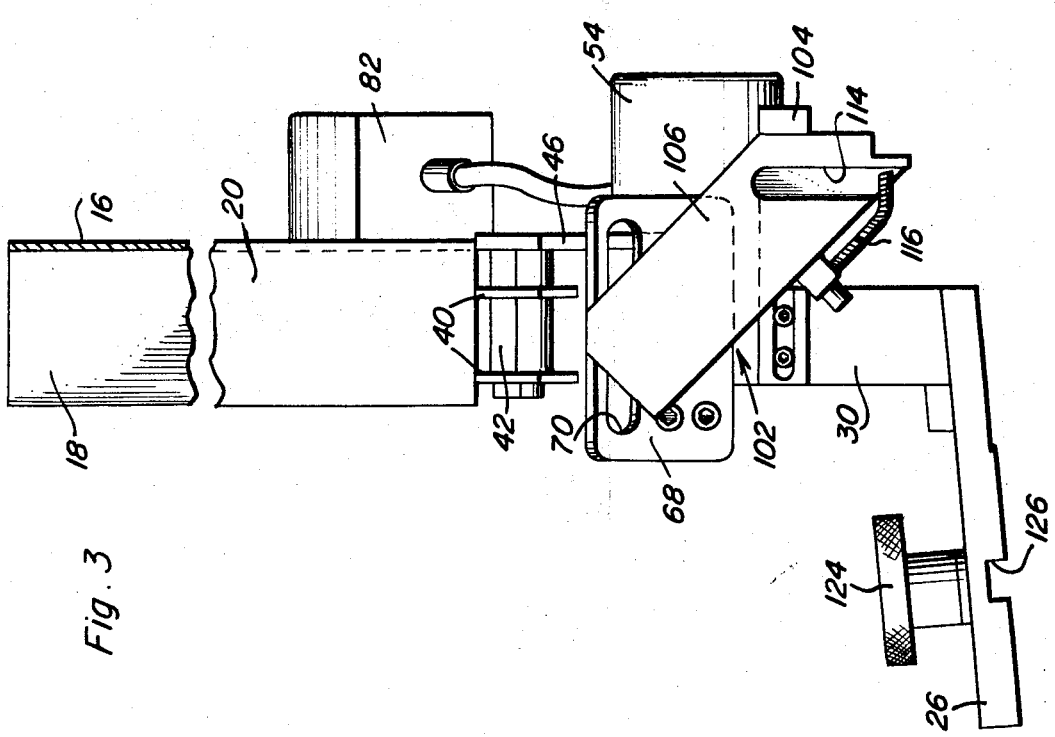

3,771,693

VIAL LOADING APPARATUS

BACKGROUND OF THE INVENTION

1. Field of the Invention

The present invention generally relates to a vial loading apparatus and more particularly to a device for receiving a plurality of vials and supporting them in a horizontal position and discharging the vials singly with the open end up and the bottom end down for positioning in an indexing machine for subsequent filling or loading and sealing.

2. Description of the Prior Art

Vials of various sizes are used for many purposes such as packaging a predetermined quantity of flowable material, such as liquid, so that such material may be expediently dispensed. In filling vials, manual positioning of the vials in an indexing machine requires considerable manual dexterity and introduces inefficiencies and human error into this operation.

Efforts have been made to position small cylindrical articles in a particular orientation for subsequent operations on such articles. Exemplary patents illustrating such efforts are prkor U.S. Pat. Nos. 2,193,492; 2,341,014; 2,782,577; 3,212,668 and 3,367,534. These patents all incorporate features which render the structures disclosed therein of little value in handling relatively small lightweight vials. For example, U.S. Pat. No. 2,193,942 is for handling a much larger object where each piece of glassware is handled separately which would be quite objectionable in handling a large number of small vials. U.S. Pat. No. 2,341,014 includes inclined rails for supporting objects but in this construction, the objects or articles are positioned vertically in the machine which would require a manual operation in and of itself when placing a large number of vials in the machine at one time which must be accomplished if efficiencies of operation are to be attained. The other patents mentioned also have similar shortcomings which would render them inefficient if not inoperative for the purposes of handling small vials.

SUMMARY OF THE INVENTION

An object of the present invention is to provide a loader for handling small and fragile articles such as vials which are very light in weight such as a fraction of an ounce. The vials are normally supplied in small disposable cardboard boxes which may hold as many as 625 pieces. In order to remove these vials from the cardboard box by hand and place them in an indexing machine with the open end up requires much time and effort. The loader of this invention includes a hopper structure which enables one side of the box that contains the vials to be removed and oriented in the hopper in a manner to enable all of the vials to be placed in the loader at one time without individually handling the vials.

A further object of the invention is to provide a vial loading apparatus in which a plurality of vials are supported in a horizontal position on a pair of inclined supporting rails together with a timing gate for discharging the vials one at a time into a feeder block having a slot arrangement therein which turns the vials upright and at the same time positions them in the correct place in the indexing machine.

A further important object of the invention is to provide a vial loading apparatus which relies upon gravity and employs a reciprocal timing gate as the only moving component thereof thereby providing an apparatus which is quite simple in construction, easy to load, efficient in operation and relatively inexpensive to operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an end view of the construction of FIGS. 1 and 2.

FIG. 4 is a vertical sectional view of the agitator structure for agitating the vials.

FIG. 5 is a detailed sectional view of the adjustment for the timing gate actuator.

DESCRIPTION OF THE PREFERRED EMBODIMENT

Figure 1:
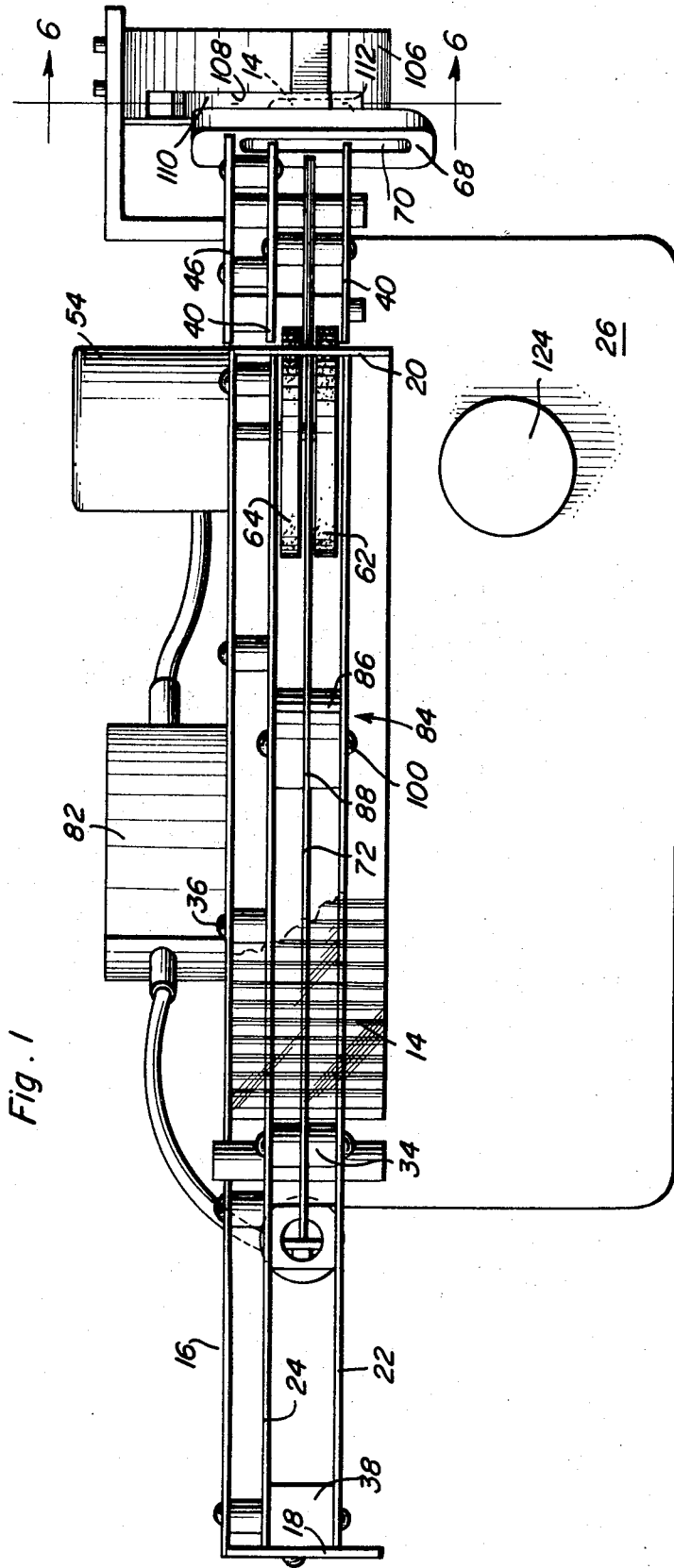
FIG. 1 is a top plan view of the apparatus of the present invention.
Figure 7:
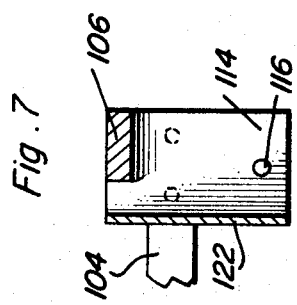
FIG. 7 is a detailed sectional view taken substantially upon a plane passing along section line 7—7 of FIG. 6 illustrating further structural details of the feeder block.

Referring now specifically to the drawings, the vial loading apparatus of the present invention is generally designated by the numeral 10 and includes a vertically oriented hopper 12 for receiving a plurality of vials 14 disposed in horizontal orientation therein. The apparatus as disclosed is particularly adapted for use with glass vials ranging in size from 6 to 7 millimeters O.D. and from 45 to 60 millimeters long. The device may also be used for various similar cylindrical objects made of glass, metal or other type of material having an O.D. from 2 millimeters up and a length of 20 millimeters up depending upon the application. As illustrated, the hopper 12 will accommodate approximately 3,000 vials 14 and relies upon gravity for discharging and orienting the vials 14.

The hopper 12 includes a vertical wall 16 which is in the form of a substantially flat side plate. The hopper 12 also includes end plates 18 and 20 which are integral with or connected to the plate 16 in any suitable manner thus leaving one side of the hopper open so that vials in a cardboard box may be placed into the hopper in a single operation by removing the top or one side of the cardboard box and positioning all of the vials in the hopper 12 in one operation.

As illustrated, the bottom edge of the side plate 16 of the hopper is inclined with the end wall 18 being shorter than the end wall 20. Defining the bottom of the hopper 12 is a pair of parallel spaced inclined rails 22 and 24 which are also parallel to the lower edge portion of the side plate 16 as illustrated in FIG. 4 so that a vial 14 will be horizontally supported by the upper edges of the two rails 22 and 24 with the end of the vial in engagement with the inner surface of the side plate 16 so that the vials will move toward the lower end of the rails 22 and 24 due to the force of gravity.

The hopper 12 is supported from a supporting base plate 26 by vertical brackets 28 and 30 which are received between the lower edges of the rails 22 and 24 and secured thereto by fasteners 32 and spacers 34. At various positions, the side wall 16 is supported from the inner wall 24 by fasteners and spacers 36 and the end wall 18 may be secured to a spacer block 38 between the ends of the rails 22 and 24.

The lower end of the hopper, that is, the end defined by the lower ends of the rails and the bottom edge of the end plate 20, is defined by a plurality of bars or rails 40 which are supported in spaced relation by fastener and spacer assemblies 42 with the rails 40 being spaced from the rails 22 and 24 thus defining a discharge opening or throat 44 that projects laterally beyond the end wall 20 in an inclined path which is a continuation of the top edge of the rails 22 and 24. A side plate 46 is provided as an extension of the side plate 16 but may be separate therefrom to enable variation of the characteristics of the discharge opening 44. The inner edges of the rails 40 are rounded as at 48 to facilitate entrance of vials into the throat 44 and the rounded end edge 48 is received in the opening defined by the lower edge of the end plate 20.

An agitator assembly 50 is supported below the discharge end of the hopper 12 by a support bracket 52 extending to the base plate 26 and includes a drive motor 54 having an output shaft 56 drivingly engaged with a hub 58 which includes a central disc 60 integral therewith and which projects peripherally of the hub 58 for receiving a pair of agitator plates 62 and 64 which are received on the opposie ends of the hub 58 and engage the opposite surfaces of the disc or flange 60 and are secured in position by screw-threaded fasteners in the flange 60. The agitator plates 62 and 64 have their peripheries disposed between the rails 22 and 24 as illustrated in FIG. 4. Also, the plates 62 and 64 are substantially square in configuration but provided with rounded corners so that the corner portions of the peripheries of the agitator plate 64 will engage with the horizontally disposed vials 14 to agitate the same so that they will roll freely down the upper inclined edges of the rails 22 and 24 as the vials enter the discharge slot or throat 44 thereby assuring a constant discharge of vials by gravity down through the throat or slot 44. The discs 62 and 64 may be constructed of non-metallic material such as rubber, plastic or the like and be sufficiently non-rigid to avoid damage of the vials such as could occur if the plates were constructed of metal and the vials constructed of glass.

Disposed in perpendicular relation to the planar ends of the rails 22 and 24 and the rails 40 as well as the side plate extension 46 is a timer gate 68 generally in the form of a plate structure having a horizontally disposed slot 70 therein which will register with the throat or slot 44 for receiving a single vial when so registered. The timing gate 68 is supported at one end of an elongated bar 72 which is disposed between the rails 22 and 24 but with the top edge thereof disposed below the top edges of the rails 22 and 24 as illustrated in FIG. 4. The end of the bar 72 remote from the timing gate 68 is connected to a rod or bar 74 that extends vertically downwardly and is connected with the output shaft or core 76 of a solenoid 78 secured to the bracket 28 by a supporting bracket assembly 80. The specific details of the solenoid, its mounting sturcture and connection with the rod 74 are substantially conventional and the solenoid 78 is electrically connected to a control box 82 as is the electric motor 54.

The central portion of the actuating bar 72 is supported from a fulcrum assembly generally designated by the numeral 84. The fulcrum support 84 for the actuating bar 72 includes a circular disc 86 having a peripheral recess 88 therein which receives the bar 72 with a fastener 90 securing the bar in the recess 88 as illustrated in FIG. 5. The disc 86 is provided with an eccentric bore 92 therethrough which receives bushings 94 that are spaced apart by spacers 96. A bearing retainer 98 extends through the bearing elements 94 and serves to retain them in assemblied relation with the bearing retainer being hollow for receiving a fastener such as a rivet or the like 100 which also extends through the rails 22 and 24 thus mounting the fulcrum 84 in position between the rails 22 and 24 with the fastener 90 serving to retain the bar 72 in mounted position between the rails 22 and 24 and providing a fulcrum point for the actuating bar 72 so that as the solenoid 78 reciprocates one end of the bar 72, the opposite end thereof, will be also reciprocated in a plane parallel to but spaced from the discharge end of a slot or throat 44.

Figure 6:
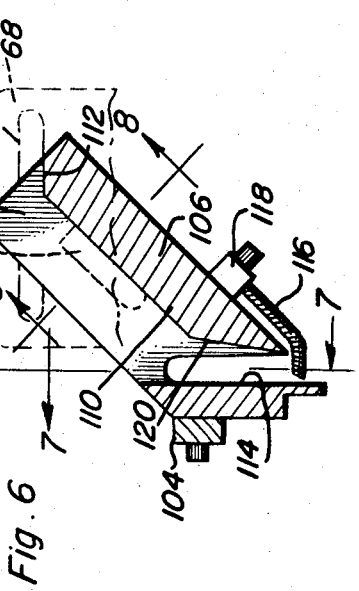
FIG. 6 is a detailed sectional view of the feeder block taken substantially upon a plane passing along section line 6—6 of FIG. 1.
Figure 8:
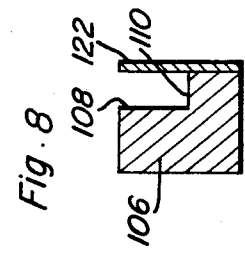
FIG. 8 is a detailed sectional view taken substantially upon a plane passing along section line 8—8 of FIG. 6.
Figure 2:
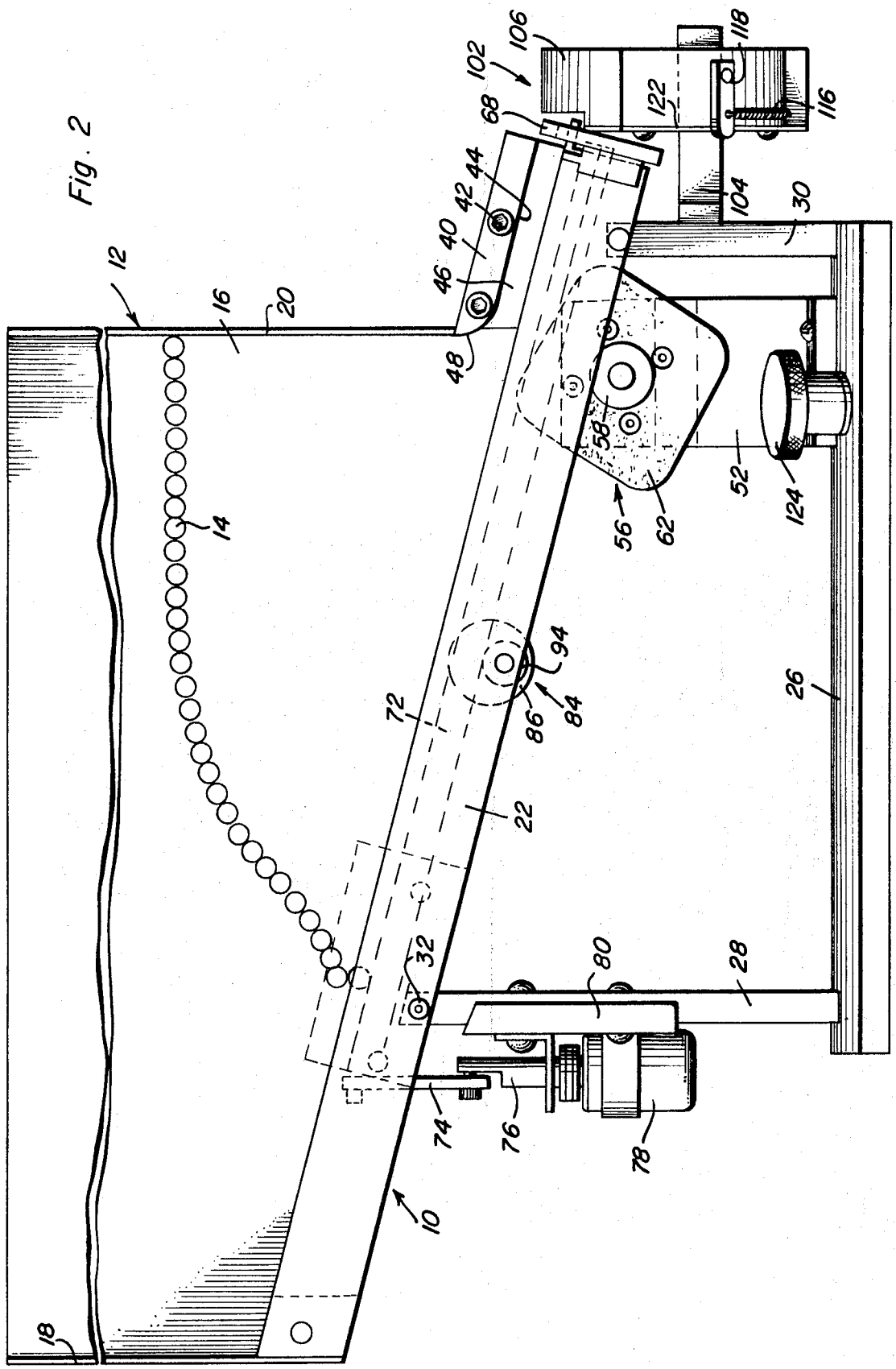
FIG. 2 is a side elevational view of the apparatus with portions of the hopper being broken away.

A feeder block generally designated by reference numeral 102 is supported in alignment with the timing gate 68 by a bracket 104 of L-shaped configuration which extends from the upstanding bracket 30. The block 102 includes a body 106 having a recess 108 in the upper surface thereof which includes an inclined bottom surface portion 110 and a substantially horizontal bottom surface portion 112 which is generally in alignment with the horizontal slot 70 in the timinggate 68. The body 106 which is inclined is provided with a vertical slot 114 that communicates at its upper end with the recess 108 and is open at its lower end for discharge of the vials into an indexing machine (not shown). A spring 116 which is in the form of a coil spring is mounted from the bottom of the body 106 by a fastening assembly 118 and extends into the bottom portion of the vertical slot 114 in order to assure that the vials 14 will be oriented vertically with the bottom end down. Thus, with the vials 14 oriented in the manner as illustrated in FIG. 4, that is, with the closed end against the side plate 16 which is the condition in which they are placed in the hopper, the vials will be discharged horizontally and individually through the slot 70 into the recess 108 where the open end will engage the horizontal portion of the surface 112 and the closed end will drop downwardly onto the inclined surface 110 and then slide downwardly into the slot 114 along the more sharply inclined surface 120 as illustrated in FIG. 6 with the spring finger 116 serving to assure that the vertical orientation of the vials 14 will be maintained during their vertical movement downwardly into the indexing machine. The surface of the block 112 which faces the timing gate 68 is provided with a plate 122 which may be removably attached thereto and which forms a partial closure for the recess 108 but which has a top edge that will be oriented generally in alignment with the bottom edge of the horizontal slot 70 when the timing gate is in position for discharging a vial which has been received from the throat 44. In other words, the slot 70 in the timing gate 68 defines a trap area for a single vial which is then conveyed from its pickup position in alignment with the discharge slot or throat 44 to a position in alignment with the upper edge of the plate 122 so that the vial will roll into the recess 108 where it will engage the inclined surfaces 112, 110 and then the inclined surface 120 and the vertical edge surface of the slot 114.

Also, as illustrated, the plate or mounting base 26 is inclined in a manner so that when it is fastened to a supporting surface by a mounting screw 124 and the like, the hopper will actually be inclined slightly from vertical with the open side of the hopper facing upwardly. As illustrated, the base plate 26 may also be provided with a groove 126 or the like to facilitate orientation and mounting of the apparatus in relation to or onto a supporting surface, indexing machine or the like.

With this apparatus, only a very few moving parts are provided which eliminates wear and the device effectively handles an object which is very small and fragile and which may weigh as little as a fraction of an ounce but yet it will rapidly and accurately position the vials in the indexing machine. The vials travel along the rails in a horizontal position and fall one by one into the block where the vials are oriented in an upright position in accurate relation to the indexing machine so that they will be rapidly and accurately positioned in an upright position by the contour of the surfaces in the feeder block. The vials are always in a certain direction, that is, with the closed end against the side plate and all of the vials are disposed in a horizontal position inasmuch as this is the way that the unfinished vials are packed in the disposable cardboard boxes thus enabling rapid loading of the vials into the apparatus without handling of the vials. The solenoid activates the gate in a manner to let one vial fall at a time thereby providing an effective and automatic loading apparatus for positioning the vials in an indexing machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A vial loading apparatus comprising a hopper adapted to receive a plurality of vials oriented in substantially horizontal position, the bottom of said hopper being defined by a pair of spaced parallel rails having the upper edges thereof inclined downwardly from one end to the other to define a discharge area at the lower end of the hopper, guide means extending laterally from the discharge area of the hopper for discharging vials while in substantially a horizontal orientation, a timing gate having a passage therein for alignment with the guide means, means operating the timing gate for individual discharge of the vials one at a time, and a feeder block disposed adjacent the timing gate for receiving the vials therefrom one at a time, said feeder block including passage defining means for tilting the vials with the bottom end downwardly and discharging them in a vertical direction and in an upright manner, said means operating the timing gate including an elongated bar connected at one end to the timing gate, fulcrum means supporting the bar from the rails at an intermediate position and means at the opposite end of the bar for causing oscillation thereof for oscillating the timing gate.

2. The structure as defined in claim 1 wherein said timing gate is in the form of a plate structure having a horizontally disposed slot therein for selective alignment with the guide means for receiving a vial therefrom in individual, one by one relationship.

3. The structure as defined in claim 2 wherein said hopper includes one side wall for engagement by the bottom ends of a plurality of vials disposed therein, the other side wall of the hopper being open to enable loading of the hopper from a supply container for the vials thereby enabling a plurality of vials to be loaded into the hopper in one operation.

4. The structure as defined in claim 3 wherein the passage defining means in said feeder block includes an upwardly opening recess therein having a bottom surface receiving a vial with the bottom surface including a horizontal portion aligned with the passage in the timing gate and an inclined portion with the open end of the vial adapted to engage the horizontal portion of the bottom surface and a major portion of the vial including the bottom end overlying the inclined portion whereby the vial will tilt into engagement with the inclined portion of the bottom surface due to gravitational forces, said block also including a vertical slot open to the bottom thereof and communicated with the recess for receiving the vial from the inclined portion of the bottom surface of the recess and discharging the vial in an upright condition with the bottom end down and the top end up.

5. The structure as defined in claim 4 wherein said guide means is in the form of a pair of rails disposed in overlying relation to and in spaced relation to the rails on the bottom of the hopper with the rails on the bottom of the hopper and the overlying rails extending laterally from the hopper.

6. The structure as defined in claim 1 together with agitator means associated with the bottom portion of the hopper for engaging and agitating the vials.

7. The structure as defined in claim 6 wherein said agitator means includes a pair of non-circular, non-metallic plates having peripheral portions engageable with the vials in the bottom portion of the hopper adjacent the discharge area for agitating the vials resting on the rails to assure horizontal discharge of the vials through the guide area.

8. The structure as defined in claim 5 wherein said block includes a spring member oriented in the path of movement of the vials as they are discharged from the vertical slot in the block to assure that the vials are vertically oriented when discharged.

9. A device for dispensing and positioning elongated articles comprising hopper means for supporting a plurality of articles in generally horizontal position, means discharging articles singly from the hopper means, and a feeder member adjacent the discharge means for receiving the articles therefrom, said feeder member including means tilting the articles with one end disposed downwardly and discharging the articles in a vertical orientation, said means tilting the articles including an elongated recess having an inclined bottom surface for receiving the articles from the hopper means whereby the articles are inclined when supported on the bottom surface of the recess, and a vertical opening communicating with the lower portion of the inclined bottom surface for slidingly receiving the articles from the inclined bottom surface and discharging the articles in a vertical orientation, said hopper means including an inclined supporting surface for supporting said articles, said means discharging articles singly including a timing gate having an elongated opening therein for receiving one of the articles, said hopper means including a discharge guide means retaining the articles in side-by-side orientation as they are discharged, and means moving the timing gate whereby the opening therein will sequentially register with the discharge guide means for receiving a single article therefrom and the elongated recess in the feeder member to deposit the single article on the inclined bottom surface thereof.

10. The structure as defined in claim 1 wherein said hopper has a side wall and two end walls substantially perpendicular thereto and extending generally in an upright direction with the other side wall being open to enable the hopper to be loaded from a supply container of vials whereby all of the vials from the supply container may be positioned simultaneously in the hopper.

11. The structure as defined in claim 1 wherein the passage defining means in said feeder block includes an upwardly opening recess therein having a bottom surface receiving a vial with the bottom surface including a horizontal portion aligned with the passage in the timing gate and an inclined portion with the open end of the vial adapted to engage the horizontal portion of the bottom surface and a major portion of the vial including the bottom end overlying the inclined portion whereby the vial will tilt into engagement with the inclined portion of the bottom surface due to gravitational forces, said block also including a vertical slot open to the bottom thereof and communicated with the recess for receiving the vial from the inclined portion of the bottom surface of the recess and discharging the vial in an upright condition with the bottom end down and the top end up.

12. The structure as defined in claim 1 wherein said guide means is in the form of a pair of rails disposed in overlying relation to and in spaced relation to the rails on the bottom of the hopper with the rails on the bottom of the hopper and the overlying rails extending laterally from the hopper.

13. A vial loading apparatus comprising a hopper adapted to receive a plurality of vials oriented in substantially horizontal position, the bottom of said hopper being defined by a pair of spaced parallel rails having the upper edges thereof inclined downwardly from one end to the other to define the discharge area at the lower end of the hopper, guide means extending laterally from the discharge area of the hopper for discharging vials while in substantially a horizontal orientation, a timing gate having a passage therein for alignment with the guide means, means operating the timing gate for individual discharge of the vials one at a time, and a feeder block disposed adjacent the timing gate for receiving the vials therefrom one at a time, said feeder block including passage defining means for tilting the vials with the bottom end downwardly and discharging them in a vertical direction and in an upright manner, agitator means associated with the bottom portion of the hopper for engaging and agitating the vials, said agitator means including a pair of non-circular plates having peripheral portions engageable with the vials in the bottom portion of the hopper adjacent the discharge area for agitating the vials resting on the rails to assure horizontal discharge of the vials through the guide area.

14. A device for dispensing elongate articles in substantially an upright condition comprising hopper means supporting a plurality of articles in a generally horizontal position, said hopper means including an inclined bottom, a guide area at the lower end of the hopper means forming a discharge passage for discharging the articles from the hopper means while generally in horizontal position and laterally of the hopper means, timing gate means reciprocally mounted adjacent the hopper means and including a slot receiving a single article with the slot being substantially horizontally disposed and selectively aligned and misaligned with respect to the passage through which the articles are discharged from the hopper means, a feeder member oriented adjacent the timing gate for receiving single articles from the slot in the timing gate, said feeder member including an inclined surface facing upwardly which receives the articles as they are discharged singly from the slot in the timing gate, the lower end of the inclined surface including a vertically oriented discharge opening whereby the articles deposited on the inclined surface will move downwardly through the vertically disposed opening due to gravity thereby positioning the articles in substantially vertical position.

15. The structure as defined in claim 14 wherein the bottom of said hopper means is defined by spaced rails, agitator means extending between the rails and engaging the articles in the hopper means for agitating the articles to assure discharge from the hopper means, said timing gate including an elongated bar extending along the bottom of the hopper means with one end connected to the plate with the slot therein, and means oscillating said bar for reciproating the timing gate.

* * * * *